US006889465B1

(12) United States Patent
Holmes

(10) Patent No.: US 6,889,465 B1
(45) Date of Patent: May 10, 2005

(54) RIFLE MOUNT

(76) Inventor: Jesse E. Holmes, 2503 Seven Oaks Rd., Waynesboro, GA (US) 30830

( * ) Notice: Subject to any disclaimer, the term of this patent is extended or adjusted under 35 U.S.C. 154(b) by 0 days.

(21) Appl. No.: 10/728,418

(22) Filed: Dec. 8, 2003

(51) Int. Cl.$^7$ .......................... F41A 27/30; F16M 11/38
(52) U.S. Cl. ........................................ 42/94; 248/431
(58) Field of Search .......................... 42/94; 206/317; 248/155.2, 164, 431, 432, 440.1

(56) References Cited

U.S. PATENT DOCUMENTS

| | | | |
|---|---|---|---|
| 1,431,058 A | * | 10/1922 | Sutter ............................ 42/94 |
| RE16,238 E | | 12/1925 | Thompson |
| 2,368,792 A | * | 2/1945 | Willman ......................... 42/94 |
| 2,574,143 A | | 11/1951 | Colby |
| 4,271,969 A | | 6/1981 | Gnesa |
| 4,397,112 A | * | 8/1983 | York .............................. 42/94 |
| 4,515,301 A | | 5/1985 | A'Costa |
| 4,575,964 A | * | 3/1986 | Griffin .......................... 42/94 |
| 4,893,427 A | | 1/1990 | Davidson |
| D333,334 S | | 2/1993 | Davidson |
| 5,311,693 A | * | 5/1994 | Underwood .................... 42/94 |
| 5,406,732 A | * | 4/1995 | Peterson ........................ 42/94 |
| 5,507,111 A | * | 4/1996 | Stinson et al. ................. 42/94 |
| 5,930,931 A | * | 8/1999 | Watson .......................... 42/94 |
| 5,930,932 A | * | 8/1999 | Peterson ........................ 42/94 |
| 6,253,482 B1 | * | 7/2001 | Peterson ........................ 42/94 |
| 2002/0078617 A1 | * | 6/2002 | Percival ........................ 42/94 |
| 2003/0042388 A1 | * | 3/2003 | Peterson ................. 248/440.1 |

* cited by examiner

Primary Examiner—Teri Pham Luu
Assistant Examiner—Bret Hayes
(74) Attorney, Agent, or Firm—Donald R. Schoonover

(57) ABSTRACT

A rifle mount includes two support legs that are pivotally connected together and which rest on a hunter's thighs to support a rifle in a ready position. The hunter merely moves the rifle into a shooting position when executing a shot, and can aim the rifle by moving his or her thighs.

3 Claims, 2 Drawing Sheets

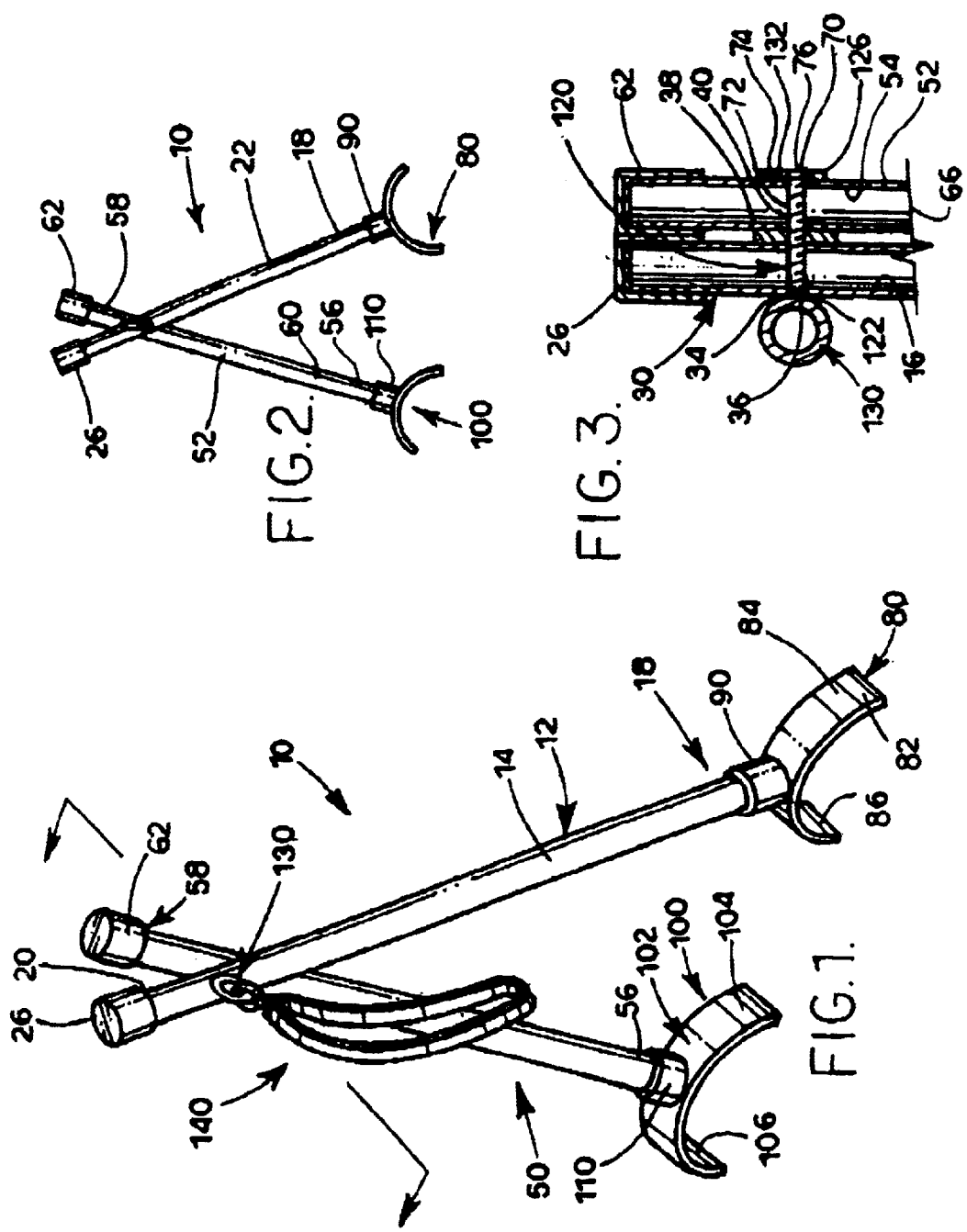

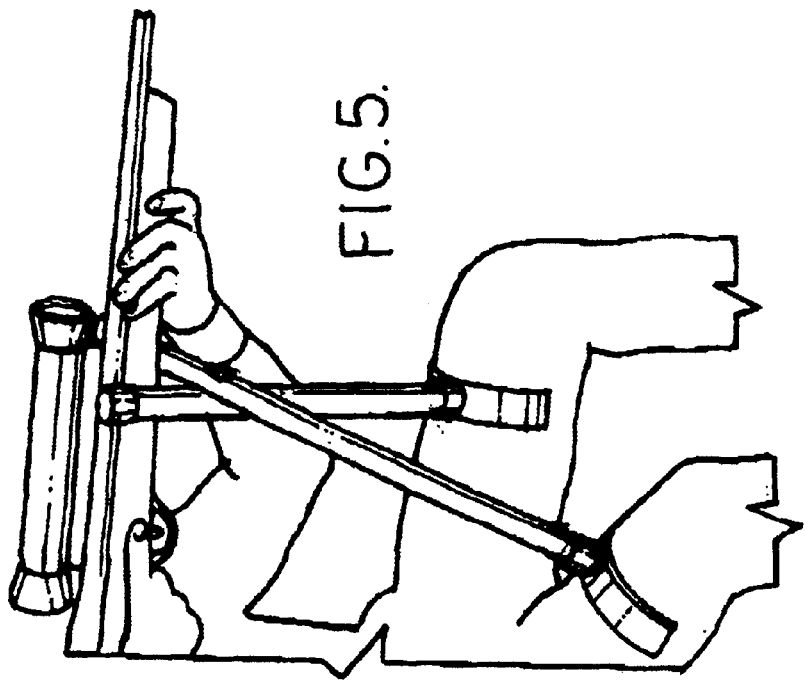
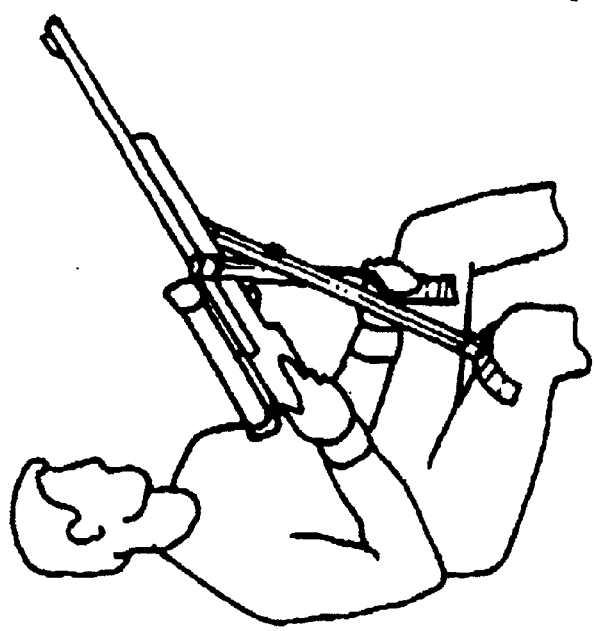
FIG. 4.
FIG. 5.

RIFLE MOUNT

BACKGROUND OF THE INVENTION

1. Field of the Invention

The present invention relates to the general art of firearms, and to the particular field of rests and supports for firearms.

2. Discussion of the Related Art

It is well known that hunting is one of the most popular sports in America. Millions of hunters participate in the sport during all seasons. For this reason, the arts associated with hunting and hunting equipment contain many examples of devices and methods intended to make hunting easier and more efficient.

One form of hunting requires a hunter to remain stationary for long periods of time. During this waiting time, the hunter is required to be ready to execute a shot whenever a target presents itself. Thus, the hunter must remain stationary for long periods, but ready to shoot at a moment's notice. This may require the hunter to hold his or her firearm in a shooting position for great lengths of time. Not only is this uncomfortable, it may adversely affect the hunter's aim due to fatigue.

Therefore, there is a need for a support for a firearm that will permit a hunter to remain stationary with the firearm in a firing position.

While the art contains many examples of firearm supports, these supports all have various shortcomings that prevent the hunter from being able to remain stationary for long periods of time yet to have the firearm in firing position ready for an accurate shot. For example, some firearm supports include a tube that is based on the ground. These supports may require the hunter to adopt an uncomfortable position or require the hunter to pick up the firearm to shoot. In the first case, the hunter may not be in the most desirable shooting position when a target appears and in the second case the hunter may lose the opportunity for an accurate shot during the time the firearm is being removed from the support and/or moved into shooting position. Other firearm supports attach the firearm to a support, such as a tree or even to the hunter's lap. These supports do not permit accurate and rapid shooting.

Therefore, there is a need for a support for a firearm that will permit a hunter to remain stationary with the firearm in a firing position while holding the firearm in a shooting position during the wait.

Aiming a firearm is never easy, and accurately and quickly aiming a firearm is often what separates a successful shot from an unsuccessful shot. As discussed above, while the art contains many examples of firearm supports, these known firearm supports are not amenable to accurate and rapid aiming of a firearm after a long period of firearm support.

Therefore, there is a need for a support for a firearm that will permit a hunter to remain stationary with the firearm in a firing position while holding the firearm in a shooting position during the wait and will permit the hunter to quickly and accurately aim the firearm for a shot.

PRINCIPAL OBJECTS OF THE INVENTION

It is a main object of the present invention to provide a support for a firearm that will permit a hunter to remain stationary with the firearm in a firing position.

It is another object of the present invention to provide a support for a firearm that will permit a hunter to remain stationary with the firearm in a firing position while holding the firearm in a shooting position during the wait.

It is another object of the present invention to provide a support for a firearm that will permit a hunter to remain stationary with the firearm in a firing position while holding the firearm in a shooting position during the wait and will permit the hunter to quickly and accurately aim the firearm for a shot.

SUMMARY OF THE INVENTION

These, and other, objects are achieved by a rifle mount which comprises a support which includes first and second crossed legs; a fastener pivotally coupling the first leg of the two crossed legs to the second leg of the two crossed legs; a first arcuate support base on the first leg, the first support base being adapted to rest on a user's thigh when in use; a second arcuate support base on the second leg of the second support base, the second support base being adapted to rest on a user's thigh when in use; a strap anchor ring on the fastener; and a support strap attached to the strap anchor ring and which is sized and adapted to fit around the neck of the user when the support strap is in use.

The rifle mount embodying the present invention thus will comfortably hold a rifle on a hunter's lap at or near a shooting position for long periods of time without tiring the hunter. The hunter can then quickly move the rifle into a comfortable shooting position and can assist the aiming process by simply moving his or her legs together to raise the rifle or moving his or her legs apart to lower the rifle. The movement of the rifle and the aiming of the rifle can be quickly done. Since the hunter has not been required to hold the rifle for long periods of time, the aiming process will be as accurate as possible for the hunter.

BRIEF DESCRIPTION OF THE DRAWING FIGURES

FIG. 1 is a perspective view of a rifle mount embodying the present invention.

FIG. 2 is an elevational view of the rifle mount shown in FIG. 1.

FIG. 3 is an elevational view taken along line 3—3 of FIG. 1.

FIG. 4 shows the rifle mount embodying the present invention supporting a rifle in a waiting position.

FIG. 5 shows the rifle mount embodying the present invention supporting a rifle in an aiming and shooting position.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a rifle mount 10. Rifle mount 10 comprises a first support leg 12. First support leg 12 includes a hollow body 14 having a tubular wall 16. A first end 18 is a base end when first support leg 12 is in a use orientation as shown in FIGS. 4 and 5. A second end 20 is a rifle-contacting end when first support leg 12 is in the use orientation. A longitudinal axis 22 extends between the first end 18 of the first support leg 12 and the second end 20 of the first support leg 12.

An end cap 26 is on the first end 18 of first support leg 12.

The first support leg 12 has an axial bore 30 defined in the hollow body 14. The axial bore 30 of first support leg 12 extends between the first end 18 of the first support leg 12 and the second end 20 of the first support leg 12.

A first fastener-accommodating hole 34 is defined through the tubular wall 16 of the first support leg 12. The first fastener-accommodating hole 34 of the first support leg 12 has a center 36.

A second fastener-accommodating hole 38 is defined through the tubular wall 16 of first support leg 12. The second fastener-accommodating hole 38 of the first support leg 12 has a center 40. Center 40 of second fastener-accommodating hole 38 of the first support leg 12 is co-linear with center 36 of first fastener-accommodating hole 34 of first support leg 12.

A second support leg 50 is identical to first support leg 12 and includes a hollow body 52 which has a tubular wall 54. A first end 56 is a base end when second support leg 50 is in a use orientation as shown in FIGS. 4 and 5.

A second end 58 of second support leg 50 is a rifle-contacting end when second support leg 50 is in the use orientation.

A longitudinal axis 60 extends between the first end 56 of second support leg 50 and the second end 58 of second support leg 50.

An end cap 62 is on the first end 56 of second support leg 50.

Second support leg 50 has an axial bore 66 defined in the hollow body 52. Axial bore 66 of second support leg 50 extends between the first end 56 of the second support leg 50 and the second end 58 of the second support leg 50.

A first fastener-accommodating hole 70 is defined through the tubular wall 54 of the second support leg 50, and has a center 72. A second fastener-accommodating hole 74 is defined through the tubular wall 54 of second support leg 50 and has a center 76. Center 76 of the second fastener-accommodating hole 74 of the second support leg 50 is co-linear with center 72 of the first fastener-accommodating hole 70 of the second support leg 50.

A first support element 80 is adapted to rest on a thigh of a user when the first support element 80 is in use. First support element 80 includes an arcuate body 82 having a first surface 84, which is a top surface when the first support element 80 is in use, and a second surface 86, which engages the thigh of a user when the first support element 80 is in use. The first surface 84 of the body 82 of the first support element 80 is convex and the second surface 86 of the body 82 of the first support element 80 is concave.

A hollow tubular sleeve 90 is mounted on the first surface 84 of the body 82 of first support element 80. Hollow tubular sleeve 90 accommodates and is fixed to first support leg 12 adjacent to first end 18 of first support leg 12.

A second support element 100 is adapted to rest on a thigh of a user when the second support element 100 is in use as shown in FIGS. 4 and 5.

Second support element 100 includes an arcuate body 102 which has a first surface 104, which is a top surface when the second support element 100 is in use, and a second surface 106, which engages the thigh of a user when the second support element 100 is in use. The first surface 104 of the body 102 of the second support element 100 is convex and the second surface 106 of the body 102 of the second support element 100 is concave.

A hollow tubular sleeve 110 is mounted on the first surface 104 of the body 102 of second support element 100.

Hollow tubular sleeve 110 of second support element 100 accommodates and is fixed to second support leg 50 adjacent to the first end 56 of the second support leg.

A threaded fastener 120 extends through the first and second fastener-accommodating holes 34, 38 of the first support leg 12 and through the first and second fastener-accommodating holes 70, 74 of the second support leg 50 when the threaded fastener 120 is in a use condition on the first and second support legs 12, 50 as shown in FIG. 3 with the tubular wall 16 of the first support leg 12 adjacent to second fastener-accommodating hole 38 of the first support leg 12 in pivoting contact with the tubular wall 54 of the second support leg 50 adjacent to first fastener-accommodating hole 70 of the second support leg 50. The first support leg 12 is pivotally attached to the second support leg 50 by the threaded fastener 120 when the threaded fastener 120 is in a use condition on the first and second support legs 12, 50.

Threaded fastener 120 includes a proximal end 122 which is located adjacent to first fastener-accommodating hole 34 in the first support leg 12 when the threaded fastener 120 is in a use condition on the first and second support legs 12, 50. A distal end 126 of threaded fastener 120 is located adjacent to second fastener-accommodating hole 74 in second support leg 50 when the threaded fastener 120 is in a use condition on the first and second support legs 12, 50.

A strap anchor ring 130 is located on the proximal end 122 of the threaded fastener 120.

A threaded nut 132 is on the distal end 126 of the threaded fastener 120 when the threaded fastener 120 is in a use condition on the first and second support legs 12, 50.

A support strap 140 is attached to the strap anchor ring 130 and is sized and adapted to fit around the neck of the user when the support strap 140 is in use as shown in FIG. 4.

The use of the rifle support 10 embodying the present invention can be understood from FIGS. 1–5 and the foregoing discussion. As shown in FIG. 4, the rifle support 10 is rested on a user's thighs with the rifle supported on the rifle support 10. To aim and shoot the rifle, the user merely lifts the rifle butt to his or her shoulder and aims and shoots the rifle in the normal manner as indicated in FIG. 5. The user can raise the rifle by simply pressing his or her thighs toward each other, or the user can lower the rifle by simply moving his or her thighs away from each other. The pivotal connection between the two rifle support legs 12, 50 causes this rising or lowering movement of the rifle due to the movement of the hunter's legs. The rifle is supported on the rifle support 10 on the user's thighs and is in position for use without requiring the user to hold the rifle in his or her hands during periods of non-use.

The various elements of rifle mount 10 can be formed of plastic material or other suitable material.

It is understood that while certain forms of the present invention have been illustrated and described herein, it is not to be limited to the specific forms or arrangements of parts described and shown.

What is claimed and desired to be covered by Letters Patent is as follows:

1. A rifle mount comprising:
   a) a first support leg which includes
      (1) a hollow body having a tubular wall,
      (2) a first end which is a base end when said first support leg is in a use orientation,
      (3) a second end which is a rifle-contacting end when said first support leg is in the use orientation, (4) a longitudinal axis which extends between the first end of said first support leg and the second end of said first support leg,
(5) an end cap on the first end of said first support leg,
(6) said first support leg having an axial bore defined in the hollow body, the axial bore of said first support leg extending between the first end of said first support leg and the second end of said first support leg,
(7) a first fastener-accommodating hole defined through the tubular wall of said first support leg, the first fastener-accommodating hole of said first support leg having a center,
(8) a second fastener-accommodating hole defined through the tubular wall of said first support leg, the second fastener-accommodating hole of said first support leg having a center, the center of the second fastener-accommodating hole of said first support leg being co-linear with the center of the first fastener-accommodating hole of said first support leg;

b) a second support leg which includes
(1) a hollow body having a tubular wall,
(2) a first end which is a base end when said second support leg is in a use orientation,
(3) a second end which is a rifle-contacting end when said second support leg is in the use orientation,
(4) a longitudinal axis which extends between the first end of said second support leg and the second end of said second support leg,
(5) an end cap on the first end of said second support leg,
(6) said second support leg having an axial bore defined in the hollow body, the axial bore of said second support leg extending between the first end of said second support leg and the second end of said second support leg,
(7) a first fastener-accommodating hole defined through the tubular wall of said second support leg, the first fastener-accommodating hole of said second support leg having a center,
(8) a second fastener-accommodating hole defined through the tubular wall of said second support leg, the second fastener-accommodating hole of said second support leg having a center, the center of the second fastener-accommodating hole of said second support leg being co-linear with the center of the first fastener-accommodating hole of said second support leg;

c) a first support element which is adapted to rest on a thigh of a user when said first support element is in use, said first support element including
(1) an arcuate body having a first surface which is a top surface when said first support element is in use, a second surface which engages the thigh of a user when said first support element is in use, the first surface of the body of said first support element being convex and the second surface of the body of said first support element being concave,
(2) a hollow tubular sleeve mounted on the first surface of the body of said first support element,
(3) the hollow tubular sleeve of said first support element accommodating and being fixed to said first support leg adjacent to the first end of said first support leg;

d) a second support element which is adapted to rest on a thigh of a user when said second support element is in use, said second support element including
(1) an arcuate body having a first surface which is a top surface when said second support element is in use, a second surface which engages the thigh of a user when said second support element is in use, the first surface of the body of said second support element being convex and the second surface of the body of said second support element being concave,
(2) a hollow tubular sleeve mounted on the first surface of the body of said second support element,
(3) the hollow tubular sleeve of said second support element accommodating and being fixed to said second support leg adjacent to the first end of said second support leg;

e) a threaded fastener which extends through the first and second fastener-accommodating holes of said first support leg and through the first and second fastener-accommodating holes of said second support leg when said threaded fastener is in a use condition on said first and second support legs, with the tubular wall of said first support leg adjacent to the second fastener-accommodating hole of said first support leg being in pivoting contact with the tubular wall of said second support leg adjacent to the first fastener-accommodating hole of said second support leg, said first support leg being pivotally attached to said second support leg by said threaded fastener when said threaded fastener is in a use condition on said first and second support legs, said threaded fastener including
(1) a proximal end which is located adjacent to the first fastener-accommodating hole in said first support leg when said threaded fastener is in a use condition on said first and second support legs,
(2) a distal end which is located adjacent to the second fastener-accommodating hole in said second support leg when said threaded fastener is in a use condition on said first and second support legs,
(3) a strap anchor ring on the proximal end of said threaded fastener, and
(4) a threaded nut on the distal end of said threaded fastener when said threaded fastener is in a use condition on said first and second support legs; and f) a support strap attached to the strap anchor ring and which is sized and adapted to fit around the neck of the user when said support strap is in use.

2. A rifle mount comprising:
a) a support which includes first and second crossed legs;
b) a fastener pivotally coupling the first leg of said two crossed legs to the second leg of said two crossed legs;
c) a first arcuate support base on the first leg wherein the first support base has a convex first surface and a concave second surface, the first support base being adapted to rest on a user's thigh when in use;
d) a second arcuate support base on the second leg wherein the second support base has a convex first surface and a concave second surface, the second support base being adapted to rest on a user's thigh when in use;
e) a strap anchor ring on said fastener; and
f) a support strap attached to the strap anchor ring and which is sized and adapted to fit around the neck of the user when said support strap is in use.

3. The rifle mount defined in claim 1 wherein said first and second support legs are constructed of plastic.

* * * * *